United States Patent
Meadows et al.

(10) Patent No.: US 8,320,935 B2
(45) Date of Patent: *Nov. 27, 2012

(54) SYSTEM AND METHOD FOR MONITORING THE LOCATION OF INDIVIDUALS VIA THE WORLD WIDE WEB USING A WIRELESS COMMUNICATIONS NETWORK

(75) Inventors: Vernon Meadows, Lilburn, GA (US); Michael S. Harper, Orlando, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/872,837

(22) Filed: Oct. 16, 2007

(65) Prior Publication Data

US 2008/0146251 A1 Jun. 19, 2008

Related U.S. Application Data

(63) Continuation of application No. 10/784,808, filed on Feb. 24, 2004, now Pat. No. 7,283,827, which is a continuation of application No. 09/604,754, filed on Jun. 28, 2000, now Pat. No. 6,716,101.

(51) Int. Cl.
*H04W 24/00* (2009.01)

(52) U.S. Cl. ............... 455/456.1; 455/404.2; 455/414.1; 455/456.2; 455/456.3; 455/456.5; 455/456.6; 455/457; 455/466; 455/521; 701/400; 340/989

(58) Field of Classification Search ............... 455/404.2, 455/414.1, 456.1–457, 466, 521; 701/200; 340/989

See application file for complete search history.

(56) References Cited

U.S. PATENT DOCUMENTS

| | | | |
|---|---|---|---|
| 5,021,794 A | 6/1991 | Lawrence | |
| 5,526,401 A | 6/1996 | Roach, Jr. et al. | |
| 5,546,445 A | 8/1996 | Dennison et al. | |
| 5,646,839 A | 7/1997 | Katz | |
| 5,731,757 A | 3/1998 | Layson, Jr. | |
| 5,742,233 A | 4/1998 | Hoffman et al. | |
| 5,802,468 A * | 9/1998 | Gallant et al. | 455/422.1 |
| 5,936,530 A | 8/1999 | Meinhold | |
| 6,088,594 A | 7/2000 | Kingdon et al. | |
| 6,154,727 A * | 11/2000 | Karp et al. | 705/3 |
| 6,216,157 B1 * | 4/2001 | Vishwanath et al. | 709/208 |
| 6,243,039 B1 * | 6/2001 | Elliot | 342/457 |
| 6,246,882 B1 * | 6/2001 | Lachance | 455/456.4 |
| 6,292,743 B1 | 9/2001 | Pu et al. | |
| 6,298,306 B1 * | 10/2001 | Suarez et al. | 701/213 |
| 6,331,825 B1 * | 12/2001 | Ladner et al. | 340/988 |
| 6,470,181 B1 | 10/2002 | Maxwell | |
| 2001/0044310 A1 | 11/2001 | Lincke | |

* cited by examiner

*Primary Examiner* — Steve D Agosta

(74) *Attorney, Agent, or Firm* — Parks IP Law LLC; Jennifer P. Medlin, Esq.

(57) ABSTRACT

A system is described for monitoring the geographical location of a subscriber's mobile cellular telephone, and for providing the location information to an authorized user through the world wide web. The geographical location of the subscriber's mobile cellular telephone is tracked using registration signals transmitted over the control channel by the cellular telephone. This information is supplied to a geographical location coordinator system, which determines the geographical coordinates for the cellular telephone. A database stores the geographical location information along with a subscriber's telephone number and account code. The database is updated to track the movement of the cellular telephone user across a geographical area.

17 Claims, 7 Drawing Sheets

Figure 3

| Code | Device Number | User Name | Loc. Addr. | Location Name | Time | Direction | Speed |
|------|---------------|-----------|------------|---------------|------|-----------|-------|
| 1582 | (301) 663-9580 | Deborah | 1225 P St. | Safeway Supermarket | 2:30 pm | — — | — — |
| 1983 | (301) 982-9503 | Brett | I-95 | — — | 2:33 pm | North | 67 mph |
| 2092 | (301) 666-9292 | Beth | Walnut St. | Rite-Aid Pharmacy | 2:30 pm | — — | — — |
| 1582 | (410) 222-3344 | Marcia | Howard St. | — — | 2:32 pm | — — | — — |
| 2933 | (215) 947-5555 | Nancy | I-66 | — — | 2:34 pm | East | 55 mph |
| 1582 | (301) 663-9301 | Brian | Phila Ave. | — — | 2:32 pm | N.E. | 64 mph |
| 2290 | (301) 444-3926 | Adam | 1333 N St. | Walmart | 2:35 pm | — — | — — |
| 3955 | (301) 999-9826 | Allison | 10 Phila Ave. | Micro Graphic Store | 2:33 pm | — — | — — |
| 1983 | (410) 555-3355 | Aslan | I-94 | — — | 2:31 | S.E. | 72 MPH |
| 1983 | (301) 487-7265 | David | 56 Cove St. | Sims Bar | | | |
| 1582 | (301) 494-5220 | Adam | Q St. | Billy's Bar | 2:32 | — — | — — |

Figure 4c
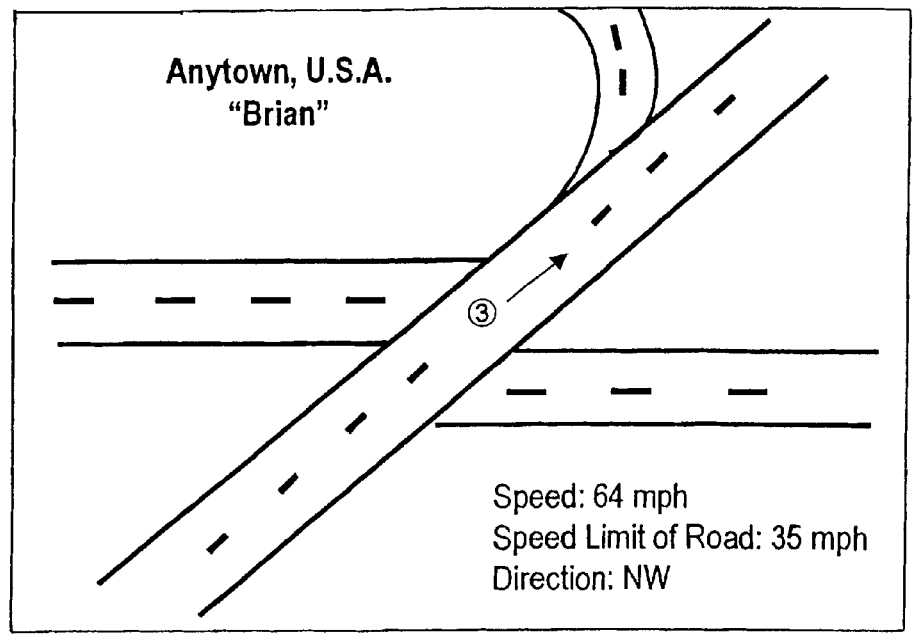
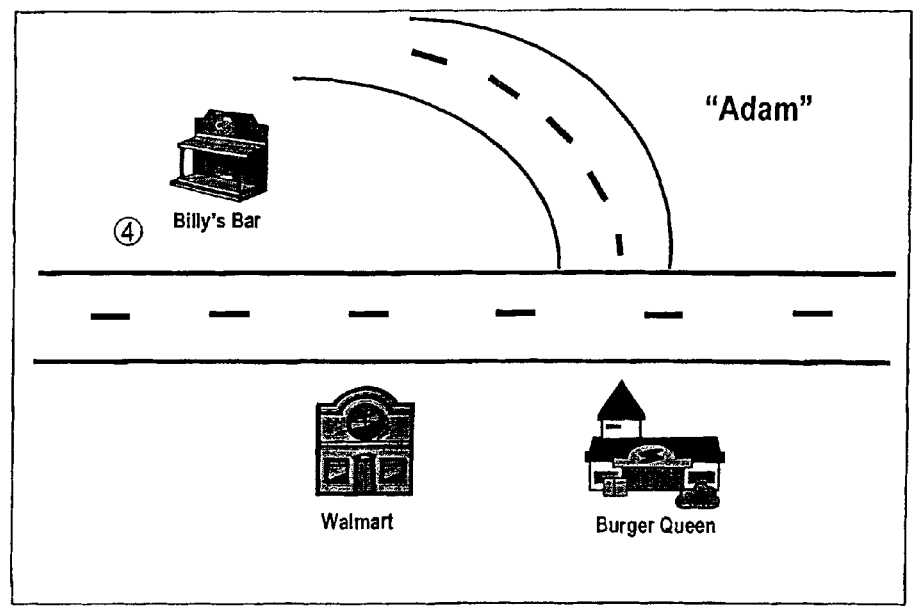

Welcome to the World Wide Watcher

Access Code: __1983__

|   |       | Status |
|---|-------|--------|
| 1.| Brett | Active |
| 2.| Aslan | Active |
| 3.| David | Active |

*Please select individuals to monitor*

❶ ❷ ❸ ❹ All

SYSTEM AND METHOD FOR MONITORING THE LOCATION OF INDIVIDUALS VIA THE WORLD WIDE WEB USING A WIRELESS COMMUNICATIONS NETWORK

CROSS-REFERENCE TO RELATED APPLICATIONS

The present application is a continuation of U.S. patent application Ser. No. 10/784,808, filed on Feb. 24, 2004 (now issued as U.S. Pat. No. 7,283,827), and entitled "System and Method for Monitoring the Locations of Individuals Via the World Wide Web Using a Wireless Communications Network," the aforementioned application being a continuation of U.S. patent application Ser. No. 09/604,754, filed on Jun. 28, 2000 (now issued as U.S. Pat. No. 6,716,101), and entitled "System and Method for Monitoring the Location of Individuals Via the World Wide Web Using a Wireless Communications Network." The disclosure of each of the aforementioned applications is hereby incorporated herein, in their entirety, by reference.

FIELD OF THE INVENTION

The present invention relates to wireless communications systems, and more particularly, to applications utilizing control signals emitted from wireless communications devices to monitor geographical location and movement.

BACKGROUND OF THE INVENTION

Tracking and monitoring devices for detecting an individual's location and movement can be used in a variety of applications. Whether for monitoring the whereabouts of children as a safety check or for tracking the productivity of employees in a business, such systems allow one to easily and more effectively supervise others from a remote location.

Conventional child locator systems provide an example of a limited-range monitoring device that can be used for monitoring children within a few hundred feet of a parent. A child wears a small, portable transmitter that emits a low power RF signal detected by a receiver worn or carried by the parent. Whenever the child strays too far from the parent, the parent's receiver no longer detects the signal and emits an alarm. The parent can then warn the child to remain within a closer range and avoid danger. The conventional child locator system can therefore be useful for detecting whether an individual who wears a monitoring device travels beyond a certain distance.

A common difficulty for parents of adolescent children is to supervise their children's activities while the children are farther away from their parents. Although parents can contact their children by providing them with mobile cellular telephones, a telephone call may create an embarrassing interruption (e.g., at the movies, at a party with friends, etc.). If the child's mobile telephone incorporates caller identification features, the child may also be inclined not to answer the parent's calls. Further, the parent may have little confidence that the child is being honest in describing his location and activities. Therefore, there is a need for a monitoring system that allows a parent to track a child's location within a wide geographical area from a remote location.

In addition to child monitoring, there are also many business applications for monitoring systems that can detect the locations of employees whose job requires travel away from the worksite. Many types of businesses employ drivers who pick up or deliver goods or patrons. For these businesses, dispatchers rely upon their drivers to communicate their location and workload, usually through a CB-type radio or a mobile cellular telephone. The dispatcher must continually speak with the drivers to learn each of their present locations in order to evaluate which driver is the most appropriate for an assignment. In supervising the drivers, the dispatcher is unable to detect whether drivers are taking unauthorized breaks or detours, or are otherwise being unproductive. For such businesses, there is a need for a monitoring system that allows a dispatcher to instantly detect the geographical locations of the drivers within the geographical area.

Accordingly, there is a need for a monitoring system that can detect the geographical location of one or more individuals and provide this information to another at a remote location.

SUMMARY OF THE INVENTION

The present invention is directed to a method and system for monitoring the geographical location of a subscriber's mobile cellular telephone, and for providing the location information to an authorized user through the world wide web. The geographical location of the subscriber's mobile cellular telephone is tracked using registration signals transmitted over a control channel by the cellular telephone. This information is supplied to a geographical location coordinator system, which determines the geographical coordinates for the cellular telephone. A database stores the geographical location information along with a subscriber's telephone number and account code. The database is updated to track the movement of the cellular telephone user across a geographical area.

An authorized user accesses the geographical location information for one or more cellular telephones using mapping software on an Internet browser. The user provides one or more access codes for each cellular telephone that the user desires to locate. Location information is provided on a street map to show the present location of the requested cellular telephones. In an alternative embodiment, the user interface additionally provides information concerning the direction and speed of movement for the requested cellular telephones. Through the browser software, the user is able to track a cellular telephone subscriber's location without placing a call or directly communicating with the subscriber.

Accordingly, it is an object of the present invention to provide a system for monitoring the geographical location of individuals within a geographical region from a remote location. The monitoring system includes at least one wireless communications device having a transmitter for transmitting a signal comprising location information. A plurality of receivers are located across a geographical region for detecting location signals transmitted by wireless communications devices. A wireless network communicates location information detected by the receivers to a location processor. An Internet server provides location information from the location processor pertaining to at least one wireless communications device to authorized users through the Internet.

It is a further object of the invention to provide a monitoring system for providing the geographical location of certain individuals within a geographical region to authorized users at a remote location. A plurality of wireless communications devices transmit signals comprising location information. Each wireless communications device is associated with an individual to be monitored. A plurality of receivers are located across a geographical region for detecting location signals transmitted by the wireless communications devices. A wireless network communicates location information detected by the receivers to a location processor. A database stores location information and associates a user access code with each wireless communications device. In operation, authorized users receive location information pertaining to each wireless communications device associated with respective user access codes.

It is yet another object of the present invention to provide a method for monitoring a geographical location of individuals within a geographical region from a remote location. The monitoring system receives control signals comprising location information from wireless communication devices associated with individuals to be monitored, where the control signals are transmitted over a wireless network. The system then processes the control signals in a location processor to determine coordinates representing locations of individuals to be monitored. The locations of individuals to be monitored are then provided to an Internet server. Authorized users are provided access to the Internet server through a website.

BRIEF DESCRIPTION OF THE FIGURES

FIG. 3 is an exemplary geographical location database table of FIG. 1 according to the preferred embodiment of the present invention.

FIG. 4c is a graphical user interface according to an embodiment of the present invention.

FIG. 4d is a graphical user interface according to an embodiment of the present invention.

DETAILED DESCRIPTION OF THE PREFERRED EMBODIMENTS

Figure 1:
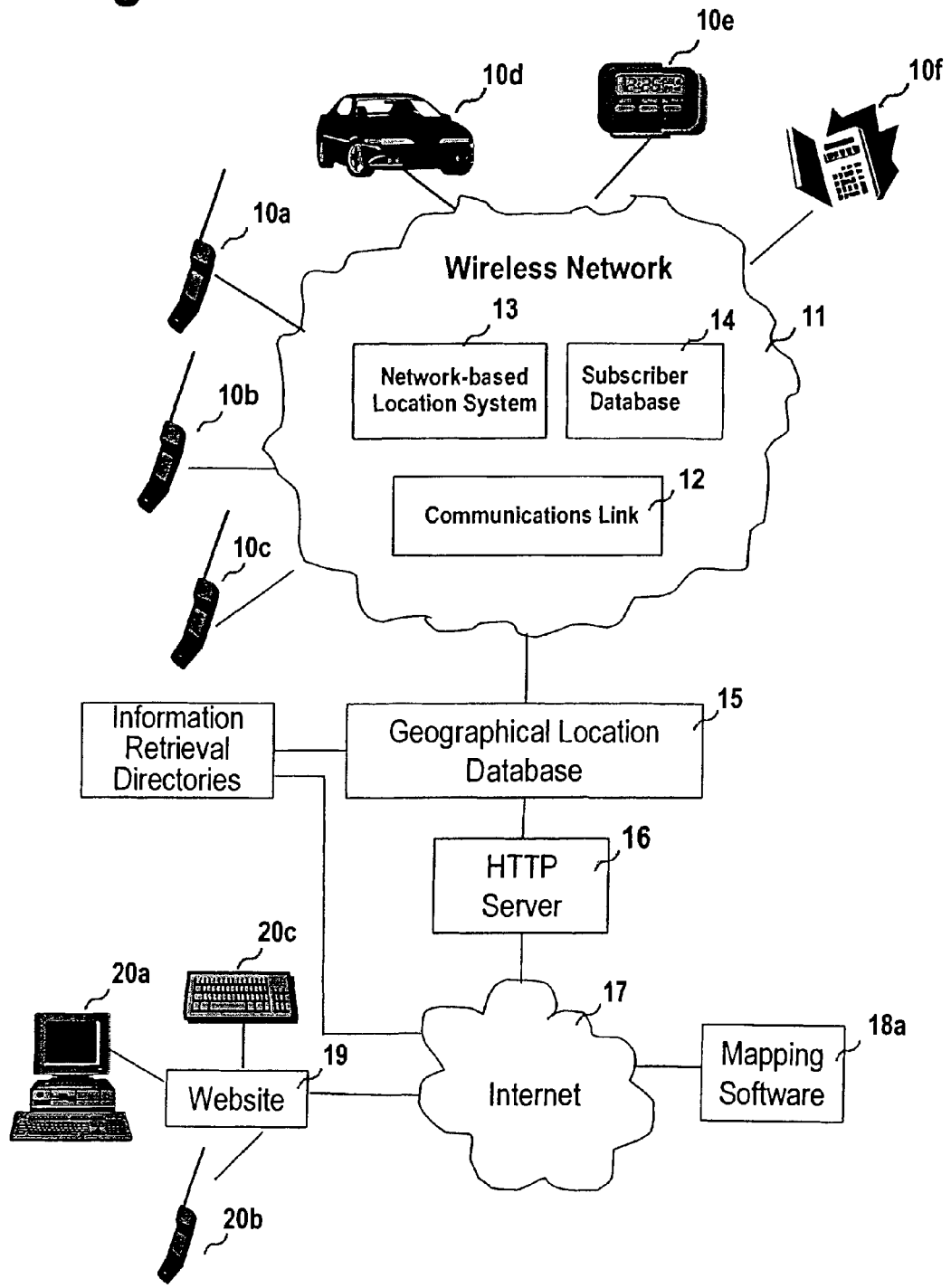
FIG. 1 is a schematic diagram of the monitoring system according to the preferred embodiment of the invention.

The architecture of the monitoring system of the present invention is described with reference to the schematic diagram in FIG. 1. A plurality of handheld devices, such as mobile cellular telephones 10a, 10b, 10c, and other wireless communications devices 10d, 10e, and 10f are in communication with a wireless communication link 12 in the wireless network 11. To track the location of the wireless devices 10, the wireless network includes a location processor 13, as will be further described below. Subscriber database 14 maintains a list of all wireless devices 10 for which a user has subscribed to a geographical location monitoring service.

Geographical location information for the handheld devices to be monitored is calculated in the location processor 13 and output to geographical locations database 15. As will be described in further detail below, location database 15 at a minimum maintains the geographical coordinates or a geographical description for each wireless device to be monitored and an account number identifying the wireless device. In alternative embodiments, the geographical location database 15 may additionally store information such as the velocity of movement of the handheld wireless device and the direction of its movement.

The geographical location database is connected to http server 16 to provide information to the Internet 17. The information provided in the geographical location database 15 is combined with information provided by mapping software 18a and information retrieval directories 18b, and the output is displayed on website 19 as a graphical interface. Website 19 can be accessed by authorized users through various media, including a personal computer 20a, wireless handheld device 20b, or an interactive pager 20c.

Figure 2:
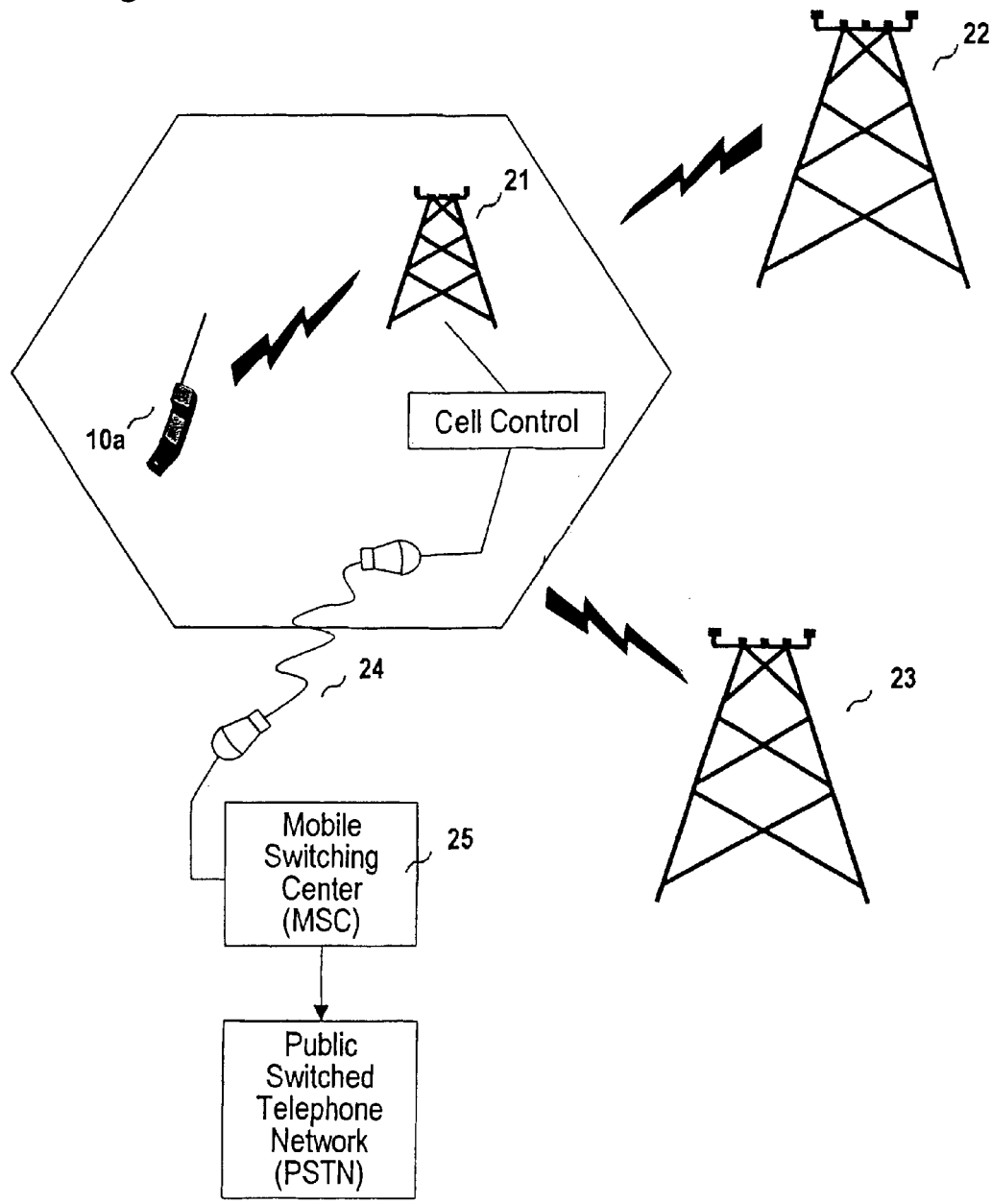
FIG. 2 is a schematic diagram of a wireless communication device located between a series of cellular towers connected to a wireless network according to the preferred embodiment of the present invention.

The geographical location for a wireless handheld device 10 may be determined according to a variety of methods. Each of these methods utilize control signals that are emitted and received by the wireless devices. As shown in FIG. 2, mobile cellular telephone 10a is located near cell towers 21, 22, and 23, and is closest to cell tower 21. The cell towers may be spaced one to five miles from each other, depending upon the amount of cellular use in a given area. In FIG. 2, each of the cell towers receives control signals from cellular telephone 10a. For cell tower 21, this information is sent to a mobile switching center (MSC) 25 through cell control 24. Cell tower 21 also broadcasts control signals sent from the MSC, which are then received by wireless devices. The control signals are used for registering that a wireless device is operating within a cell, so that the wireless network can establish a communications link between a cell tower and the device.

One method for determining the geographical location is to identify the cell tower that is physically within the closest proximity. By determining which cell tower is closest to the mobile cellular telephone and providing this information along with a mapped display on the Internet, an authorized user can find a cellular telephone user's location within a range of approximately 3 miles. This can be performed by forwarding "registration" information that is temporarily stored within an MSC to the geographical location database 15 in FIG. 1. Another technique for identifying the cell tower closest to the wireless device is to use a "mobile maintenance command signal," The mobile maintenance command sends out a paging request signal to be received by mobile telephone 10a. The mobile maintenance command is sent to all cell sites in the system, or can be sent to the last known cell site based on registration over the paging channel. The mobile is then paged (called) with a modified signal that tells the mobile to respond, but does not alert (ring). The mobile then responds back. Every cell nearby will receive the mobile's signal. Based on RSSI (received signal strength indication), the mobile is determined to be closest to a particular site in the system.

The geographical location of a wireless device can be determined with greater detail by using cell tower triangulation. In this method, the geographical location system determines the location of a wireless device by comparing the signal strength of the control signals emitted by a wireless device received at antennae at several neighboring cell towers. The signal strength is strongest at the nearest cell tower. A diminished signal is received at other cell towers in the vicinity. The differences in signal strength can be used to calculate the location of the wireless device, at least within 200 meters. Cell tower triangulation algorithms are presently being used and refined for E911 emergency services.

Yet another method for accurately determining the geographical location of a wireless device is to place location monitoring equipment within the wireless device itself. Some wireless devices currently incorporate GPS receiver chips to receive location information by satellite. By connecting the GPS receiver in a wireless device to the communication equipment within a cellular telephone, the GPS geographical information can be forwarded to the wireless network for an access by an authorized user.

As part of determining the location information, the location processor 13 must process the control signal information. The type and amount of formatting necessary depends upon both the method utilized for determining the geographical location of the wireless device and the type of information to be supplied to the authorized user. As an example, if the location is determined solely according to the identity of the closest cell tower, the network-based location system is forwarded a code identifying a cell tower. The code is then translated through a look-up table into an address, which may include information such as a street name, street intersection, county, or township. If the location is determined by the triangulation method, the calculated data is converted into geocoded location coordinates that are compatible with standard mapping software. If GPS information is communicated from the wireless device, the network-based location system merely decodes the communications signal and passes the information along to the geographical location database.

FIG. 3 provides an exemplary table of information to be stored in the graphical location database 15 of the present invention. The geographical location information provided in the table could be derived according to either the triangulation or GPS methods described above. The table also receives input from mapping software 18a and information retrieval directories 18b. The mapping software associates an address for any provided geocoded coordinates. The information retrieval directory provides names of public items of interest, such as restaurants, markets, or schools that are located at any provided geocoded coordinates. The fields in the exemplary table of information includes, for example, an authorized user access code, wireless device number, cellular user name, geographical location address, geographical location name, reporting time, direction of travel, and speed of travel. A geographical locations database could also include fields to provide additional features for an authorized user within the spirit of the invention.

FIGS. 4a-4d illustrate exemplary graphical user interfaces for the monitoring system for use as an adolescent child monitor according to the preferred embodiment. A user, in this case, a parent of adolescent children, can access the graphical user interface using a desktop or laptop-type computer system having an Internet connection to the world wide web, using Internet browser software. As provided in FIG. 4a, upon connecting to the Internet and entering the appropriate URL to access the monitoring website, the user enters an access code. The user may then be presented with a list of names of persons who the user is authorized to monitor. In this example, the user is authorized to monitor mobile telephones carried by the user's children. The list provided to the user indicates whether the wireless communication device for each of the individuals is on or off. From this list, the user selects which of the individuals to monitor. A parent in this example selects to monitor each of the parent's four adolescent children.

Figures 4A, 4B:
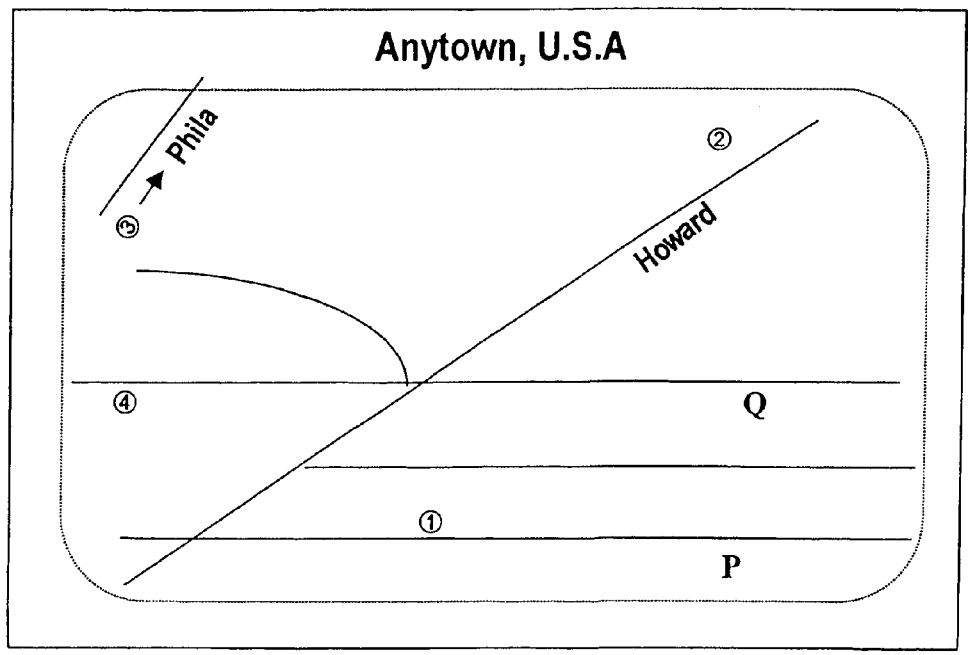
FIG. 4a is a graphical user interface according to an embodiment of the present invention.
FIG. 4b is a graphical user interface according to an embodiment of the present invention.

FIG. 4b provides an exemplary graphical user interface of the output for the monitoring system for monitoring the four adolescent children selected from FIG. 4a. As can be seen, the screen display provides a map of Anytown, U.S.A. The map is scaled such that each of the four individuals to be monitored appear on the same map. In this map, as can be seen, Deborah is located on P Street, Marcie is located on Howard Street, Brian is located on Philadelphia Avenue, and Adam is located on Q Street. The map also indicates that Brian is in transit.

By scrolling a cursor to the "3" indicator and depressing the "select" key, the user commands the monitoring system to re-scale the map to focus upon "Brian." As FIG. 4c provides a view of the re-scaled map to provide more information about "Brian." As can be seen, the system provides the speed of movement of the wireless device carried by Brian and the direction of travel. Depending upon the amount of information stored in the geographical location database 15, the system could also provide a history of Brian's movement throughout the course of the day.

If the user instead selects the "4" indicator, a re-scaled map is presented to focus upon "Adam," as illustrated by FIG. 4d. Again, the system now presents location information about the selected individual with greater detail. In this case, the information retrieval directory indicates that Adam's location on Q Street is "Billy's Bar." The system also indicates that Adam has stayed at Billy's Bar for at least two hours, since noon. If the user finds this activity to be unacceptable, the user can then opt to call the individual.

Figures 5A, 5B:
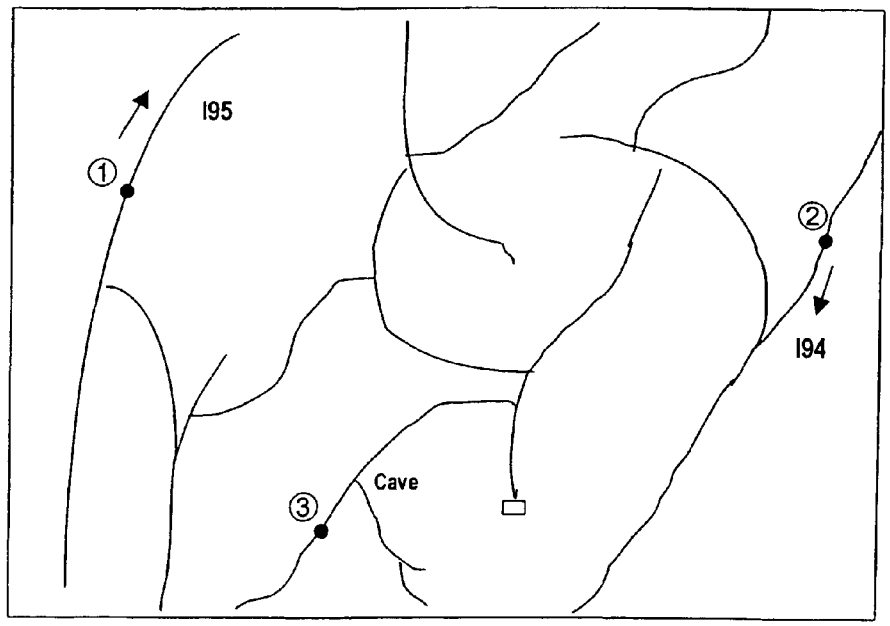
FIG. 5a is a graphical user interface according to an embodiment of the present invention.
FIG. 5b is a graphical user interface according to an embodiment of the present invention.
Figure 5C:
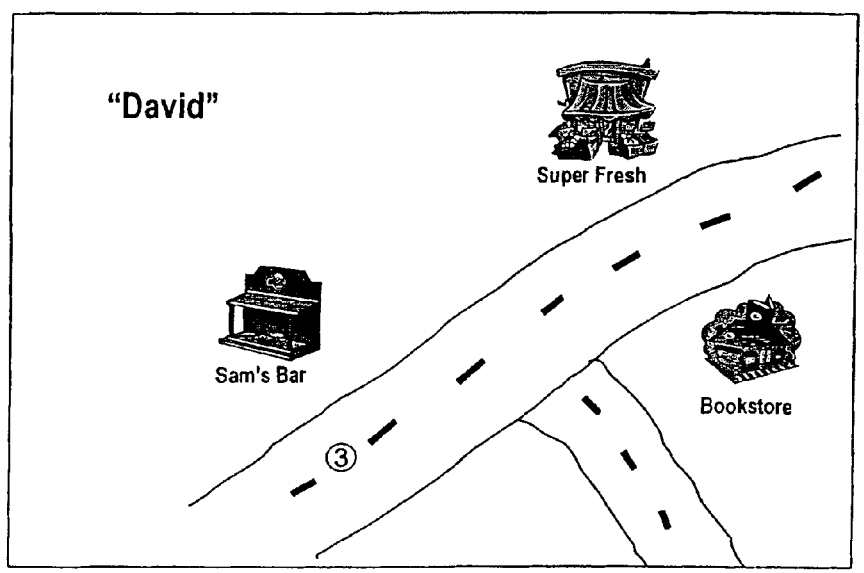
FIG. 5c is a graphical user interface according to an embodiment of the present invention.

FIGS. 5a-5c provide a second example of a graphical user interface according to the preferred embodiment. In this example, the user is a dispatcher for a taxi cab service. By entering the code "1983" in the login screen of FIG. 5a, the dispatcher is presented with a list indicating that he is authorized to monitor three individuals, "Brett," "Aslan," and "David." By selecting to display the locations of all of the individuals, a map scaled to show all of the individuals at once is displayed, in FIG. 5b. In this example, the dispatcher then selects to monitor "David" by selecting "3." As shown in FIG. 5c, by utilizing the monitoring system of the present invention, the dispatcher learns that "David" is at "Sam's Bar" during work hours, and should be reprimanded.

The monitoring system of the present invention can be configured with added features depending upon the specific application for which it will be used. For example, for the taxicab service described with reference to FIG. 5, it may be useful for the dispatcher to know whether monitored individuals are driving unoccupied cabs. This can be accomplished by utilizing a specially designed wireless communication device that has an input connected to the taxi cab fare meter. In this manner, the dispatcher can choose only to search for available empty cabs to direct them to available fares.

As shown in FIG. 1, the present invention can be used to monitor individuals who carry any of several different types of wireless communications products. As one example, the monitoring system of the present invention can be used to monitor the location of an individual carrying an interactive pager 10e. Likewise, the system can also be used for monitoring the location of an individual who carries a personal digital assistant that is configured for wireless communication on the wireless network. For the purposes of the invention, the interactive pager or personal digital assistant 10f transmit control signals in the same manner as cellular telephones, and can therefore be used as monitoring equipment in the same manner.

Cellular telephones, interactive pagers, and personal digital assistants each have a liquid crystal display (LCD) that can be used with the monitoring system of the present invention to notify the individual that they are being monitored. Many wireless communications devices include a text messaging feature to allow the users to receive e-mail messages or any other type of short text messages on the LCD display. As yet another feature of the present invention, a user who accesses the monitoring system through a website on the Internet may wish to leave a text message for an individual who is being monitored. For example, a parent may wish to leave a message for an adolescent son (e.g., we left the key under the doormat) instead of interrupting the son's activities with a telephone call. During the operation of the monitoring system, as illustrated in FIGS. 4-5, the graphical user interface can include a feature to leave a text message for a monitored individual. The entered text is then communicated from an http server, through the PSTN to the wireless network, and on through a control channel to the wireless device at the location in which it is registered.

Using conventional telephones, personal digital assistants, and interactive pagers, the monitoring system of the present invention is only useful when the person to be monitored carries the wireless communication device, keeps the battery in the unit charged, and turns on the device. If the device is not operational, it does not transmit control signals and cannot be located. Because this can obviate the usefulness of the monitoring system, the wireless communication devices can be modified such that the system is always transmitting and receiving control signals. For example, FIG. 1 includes an automobile 10d as an example of a wireless communication device that communicates in the wireless network. The automobile can be configured with a wireless transmitter/receiver that only transmits and receives control signals along the wireless network. This system can be directly connected to the electrical system of the car to the automobile battery to remain in operation. An automobile that is equipped with a limited-function wireless transmitter/receiver can therefore always be monitored.

Similarly, wireless cellular telephones, personal digital assistants, and interactive pagers can also be modified to continually transmit control signals. At the present time, mobile cellular telephones are typically equipped with batteries capable of operating in "standby" mode for several days, but have a "talk time" of only a few hours. These wireless devices can be easily modified to always run in standby, so that they can be monitored at all times. Therefore, even when the wireless device operator turns off the wireless device, the device continues to transmit low power control signals for monitoring. While this feature is useful for monitoring other individuals, it is also useful for tracking devices such as misplaced cellular telephones, pagers, and personal digital assistants.

As can be seen in FIG. 1, the output for the monitoring system of the present invention can be configured to output monitoring information for wireless communications devices such as cellular telephones, personal digital assistants, and interactive pagers. Using mapping software configured for use with a smaller LCD display in a cellular telephone or a personal digital assistant, the monitoring system can provide the same information to a user as with a personal computer. Alternatively, the monitoring system can also provide the output in a text format or in an audio format. Accordingly, a user can utilize the monitoring system to monitor the locations of others while also being in transit.

The monitoring system of the present invention includes a geographical locations database and a network-based location system that continually calculates and stores location information for each subscriber's wireless device. However, instead of continually and automatically updating and storing location information, the information can be calculated only in response to a specific user request on the monitoring system. When an authorized user enters the appropriate access code in the monitoring system's website, the wireless network will then locate the appropriate wireless devices, using one of the several techniques described above. By this method, the number of geographical location calculations that are necessary is minimized, which consequently reduces the costs of operation. It may be unnecessary to continually calculate a geographical location of an individual's cellular telephone through triangulation if there is no one who is monitoring that individual.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for monitoring a location of a wireless communication device within a geographical region from a remote location, comprising:
   an input for receiving control signals detected from the wireless communication device by a plurality of receivers located across the geographical region, wherein the control signals are continuously transmitted from the wireless communication device even when the wireless communication device is turned off;
   an output for providing location information corresponding to the wireless communication device determined according to the received control signals detected by the plurality of receivers to only authorized users through the Internet via an Internet server, wherein the location information is provided on an Internet website accessible by an authorized user on a personal computer, the location information corresponding to the wireless communication device is output to the Internet server via a geographic location database that maintains location information for a plurality of wireless communication devices sorted by authorized user access code, and location information for a plurality of wireless communication devices associated with the same access code is accessible by the authorized user.

2. The system of claim 1, wherein the location information corresponding to the wireless communication device is provided to a mapping graphical user interface accessible via the authorized user.

3. The system of claim 1, wherein the location information corresponding to the wireless communication device is provided as a text message accessible to the authorized user on an interactive pager.

4. The system of claim 1, wherein the location information corresponding to the wireless communication device is provided to the authorized user as an audio signal.

5. The system of claim 1, wherein location information for a plurality of wireless communication devices is simultaneously accessible by the authorized user.

6. The system of claim 1, further comprising:
   a processor for determining the location information corresponding to the wireless communication device according to the received control signals detected from the wireless communication device by the plurality of receivers.

7. A method for monitoring a location of a wireless communication device within a geographical region from a remote location, comprising:
   receiving control signals detected from the wireless communication device by a plurality of receivers across the geographical region, wherein the control signals are continuously transmitted from the wireless communication device even when the wireless communication device is turned off; and providing location information corresponding to the wireless communication device determined according to the received control signals detected by the plurality of receivers to only authorized users via an Internet server, wherein the location information is provided on an Internet website accessible by an authorized user on a personal computer, the location information corresponding to the wireless communication device is output to the Internet server via a geographic location database that maintains location information for a plurality of wireless communication devices sorted by authorized user access code, and location information for a plurality of wireless communication devices associated with the same access code is accessible by the authorized user.

8. The method of claim 7, wherein the location information corresponding to the wireless communication device is provided to a mapping graphical user interface accessible via the authorized user.

9. The method of claim 7, wherein the location information corresponding to the wireless communication device is provided as a text message accessible to the authorized user on an interactive pager.

10. The method of claim 7, wherein the location information corresponding to the wireless communication device is provided to the authorized user as an audio signal.

11. The method of claim 7, wherein location information for a plurality of wireless communication devices is simultaneously accessible by the authorized user.

12. A system for monitoring locations of a plurality of wireless communication devices within a geographical region from a remote location, comprising:

an input for receiving control signals detected from the wireless communication devices by a plurality of receivers across the geographical region, wherein the control signals are continuously transmitted from the wireless communication devices even when the wireless communication devices are turned off; and an output for providing location information corresponding to each of the wireless communication devices determined according to the received control signals detected by the plurality of receivers to only authorized users via an Internet server, wherein the location information corresponding to the wireless communication devices is provided on an Internet website accessible by an authorized user via a personal computer, the location information corresponding to the wireless communication devices is output to the Internet server via a geographic location database that maintains location information for the plurality of wireless communication devices sorted by authorized user access code, and location information for a plurality of wireless communication devices associated with the same access code is accessible by the authorized user.

13. The system of claim 12, wherein the location information corresponding to the wireless communication device is provided to a mapping graphical user interface accessible via an authorized user.

14. The system of claim 12, wherein the location information corresponding to each of the wireless communication devices is provided as a text message accessible to an authorized user on an interactive pager.

15. The system of claim 12, wherein the location information corresponding to the wireless communication device is provided to an authorized user as an audio signal.

16. The system of claim 12, wherein the location information for each of the plurality of wireless communication devices is simultaneously accessible by an authorized user.

17. The system of claim 12, further comprising a processor for determining the location information corresponding to each of the wireless communication devices according to the received control signals detected by the plurality of receivers.

* * * * *